Patented Dec. 1, 1925.

1,564,141

UNITED STATES PATENT OFFICE.

CARL SCHMITTUTZ, OF BAD KISSINGEN, GERMANY.

PROCESS FOR IMPREGNATING LIVING TREES.

No Drawing. Application filed October 11, 1924. Serial No. 743,097.

*To all whom it may concern:*

Be it known that I, CARL SCHMITTUTZ, engineer, citizen of the German Republic, residing at Bad Kissingen, county of Bavaria, and State of Germany, have invented certain new and useful Improvements in Processes for Impregnating Living Trees, of which the following is a specification.

My said invention relates to a method of impregnating living trees with materials such as are used for example for dyeing or for preservation of wood. By the term "impregnation" it is intended to include saturation, regardless of the specific purpose of such operation. It has heretofore been proposed to saturate the wood of a living tree for purposes of conservation as well as for dyeing the wood but the effects have not been satisfactory for the reason that the methods heretofore proposed require an undue length of time so that the tree is dead before the required degree of saturation is reached. Another drawback so far as dyeing wood is concerned arises from the fact that the distribution has not been uniform over the whole cross section of the trunk.

My method of impregnation involves the use of impregnation liquid under a higher pressure than the natural pressure of the sap so that the natural sap of the tree is forced out of the same, and the keeping-up of a continuous flow of the impregnating liquid throughout the whole trunk until it emerges in the form of a spray at points where the bark is broken; for example, at the ends of branches which have been cut off or at points on the trunk where the bark has been injured. This method of impregnation provides for completion of the process in much less time than has heretofore been necessary and also provides for depositing in the wood a much larger quantity of the impregnating substance. It is also possible to impregnate only certain parts of the tree, if desired, outlets being provided only on such parts as are intended to be impregnated. As a rule the purpose is to preserve the wood of the trunk and in such case the crown of the tree is cut off and liquid is forced into the trunk under a pressure of from six to ten atmospheres. After the process has continued for a short time sap begins to flow out in a spray at the points where the bark is broken, as where the crown of the tree has been cut off or where branches have been removed, or the bark has been abraded. After such flow of sap has continued for a short time the color of the flow changes from that of the natural sap to that of the impregnating material, if this be of different color as in the case of dyeing material. This indicates that the sap has been driven out of part or all of the standing portion of the tree and that the impregnating liquid has taken its place.

In uncut branches the sap also moves up according to the pressure on the impregnating liquid but the out-flow of sap is less than in the trunk and necessarily also the impregnation is less.

It has been proposed to dye the wood of a living tree by impregnation, a set of intersecting channels being made in the trunk to insure equal coloring throughout the wood. This expedient is rendered unnecessary by the high artificial pressure employed in my process, it being necessary only to provide a few holes for entrance of the liquid which forces its way into every vein of the tree whether directly connected with the bored holes or not and impregnates the whole cross section of the trunk uniformly. After the pressure is removed a continuous but relatively small distribution of the impregnating material takes place by diffusion.

Similar results of the process take place in the roots. The sap of the tree below the point of injection of the impregnating liquid is forced down toward the roots which have been shown experimentally to resist a pressure up to twelve atmospheres without allowing liquid to escape. The pressure of the sap is such that if the pressure on the impregnating liquid is interrupted the sap will rise and force the saturation liquid out of the wounds of the tree until a pressure balance is obtained. It should be noted as an interesting feature of my invention that if the supply openings for impregnating liquid remain in touch with a stock of such liquid after the pressure ceases (as by stopping the action of the pump) the trunk will still absorb a further large quantity of liquid, probably through the expansion caused by the liquid retained in the stump. It has been shown that a trunk into which 150 liters of liquid have been forced will thereafter absorb a further quantity of 50 liters of impregnating liquid. This indicates that a tree contains considerable quantities of air which are probably located, after the completion of my impregnating process, in a compressed state in a part of the trunk just below the entrance holes and in the roots. This may account for the subsequent absorption of liquid.

By my method the trunk of a tree can be fully and thoroughly impregnated in a space of time from one-half an hour to one hour, depending on the kind of wood and degree of pressure. The limit of pressure to be exerted on the liquid is dictated by the power of the trunk to resist bursting pressure. In some cases a tree trunk has burst at 28 atmospheres. The time required for complete impregnation is also dependent on the height of the trunk since at like pressure taller trunks require either longer time or higher pressure.

By the use of my invention it is possible to secure all of the valuable sap of the tree and this is of importance in connection with such trees as rubber trees, pine trees, Eucalyptus trees, birch trees, etc. By cuttting off the ends of the branches it is possible, according to my invention to secure the entire sap in the space of a few minutes. This result is particularly valuable, for example, in the case of rubber trees which are cut down when their output begins to fail. By treating the tree according to my method all the valuable remaining sap may be secured at once just before the tree is cut down.

Having thus fully described my said invention, what I claim as new and desire to secure by Letters Patent, is:

1. A method of impregnating living trees which consists in interrupting the continuity of the bark, and thereafter forcing impregnating liquid into the tree at such pressure as to drive out the sap at the points of interruption, substantially as set forth.

2. A method of impregnating living trees which consists in interrupting the continuity of the bark, thereafter forcing impregnating liquid into the tree at such pressure as to drive out the sap at the points of interruption, and allowing the tree to remain standing until it is dried out whereby the liquid is removed and the impregnating material remains in all parts of the tree, substantially as set forth.

3. A method of impregnating living trees which consists in interrupting the continuity of the bark, thereafter forcing impregnating liquid into the tree at such pressure as to drive out the sap at the points of interruption, and collecting the sap thus forced out of the tree, substantially as set forth.

In testimony whereof I have affixed my signature.

CARL SCHMITTUTZ.